(12) United States Patent
Huber et al.

(10) Patent No.: US 8,811,176 B2
(45) Date of Patent: *Aug. 19, 2014

(54) FEMTO CELL ACCESS POINT PASSTHROUGH MODEL

(75) Inventors: Kurt Donald Huber, Coral Springs, FL (US); Arthur Richard Brisebois, Cumming, GA (US); Judson John Flynn, Decatur, GA (US)

(73) Assignee: AT&T Mobility II LLC, Atlanta, GA (US)

(*) Notice: Subject to any disclaimer, the term of this patent is extended or adjusted under 35 U.S.C. 154(b) by 278 days.

This patent is subject to a terminal disclaimer.

(21) Appl. No.: 13/462,402

(22) Filed: May 2, 2012

(65) Prior Publication Data

US 2012/0220288 A1    Aug. 30, 2012

Related U.S. Application Data

(63) Continuation of application No. 12/340,454, filed on Dec. 19, 2008, now Pat. No. 8,194,549.

(60) Provisional application No. 61/052,055, filed on May 9, 2008.

(51) Int. Cl.
| | | |
|---|---|---|
| *H04L 1/00* | (2006.01) | |
| *H04L 12/56* | (2006.01) | |
| *H04W 72/12* | (2009.01) | |
| *H04W 84/04* | (2009.01) | |

(52) U.S. Cl.
CPC ....... *H04L 47/2441* (2013.01); *H04W 72/1226* (2013.01); *H04W 84/045* (2013.01)
USPC ........... 370/235; 370/252; 370/338; 370/401; 455/452.2

(58) Field of Classification Search
CPC ........... H04W 72/12–72/1257; H04W 84/045; H04L 45/302; H04L 47/10; H04L 47/24–47/2491
USPC ......... 370/229–235, 252, 253, 329–338, 400, 370/401; 455/450, 451, 452.1, 452.2
See application file for complete search history.

(56) References Cited

U.S. PATENT DOCUMENTS 7,626,994 B2    12/2009  Bennet et al.
7,987,003 B2 *  7/2011  Hoffberg et al. .............. 370/200

(Continued)

OTHER PUBLICATIONS

"Network Traffic Shaping Tools" http://www.processor.com/editorial/article.asp?article=articles%2Fp2816%2F07p16%2F07p16.asp posted Apr. 21, 2006 in Market watch vol. 28, Issue 16 last viewed Sep. 14, 2009, 4 pages.

(Continued)

Primary Examiner — Pao Sinkantarakorn
(74) Attorney, Agent, or Firm — Amin, Turocy & Watson, LLP

(57) ABSTRACT

The subject innovation provides system(s) and method(s) to supply fixed, differentiated quality of service (QoS) for packetized traffic (e.g., voice and data) intended for femto cell coverage when transmitted concurrently with external broadband traffic. Quality of Service differentiation is supplied without an external implementation. Femto cell coverage is prioritized over concurrent packetized traffic to deliver a rich user experience for delay and jitter sensitive applications. A passthrough configuration for a femto access point (AP) facilitates supplying hard QoS for data packet streams, or flows, intended for femto cell coverage or non-femto-cell coverage. The femto AP receives a consolidated packet stream through backhaul link(s) and distinguishes flow(s) for femto coverage and flow(s) for auxiliary broadband coverage. The femto AP routes the flow(s) intended for femto with hard QoS according to QoS policy which can be determined by a network operator or a subscriber.

20 Claims, 10 Drawing Sheets

(56) References Cited

U.S. PATENT DOCUMENTS

2008/0037525 A1* 2/2008 Karaoguz et al. ............. 370/352
2008/0207170 A1* 8/2008 Khetawat et al. ............. 455/411
2009/0029645 A1 1/2009 Leroudier et al.
2009/0059786 A1* 3/2009 Budampati et al. ........... 370/230
2009/0279701 A1 11/2009 Moisand et al.

OTHER PUBLICATIONS

OA dated Jul. 29, 2010 for U.S. Appl. No. 12/340,454, 20 pages.
OA dated Jan. 5, 2011 for U.S. Appl. No. 12/340,454, 27 pages.

* cited by examiner

FEMTO CELL ACCESS POINT PASSTHROUGH MODEL

CROSS-REFERENCE TO RELATED APPLICATIONS

This application is a continuation application of co-pending application Ser. No. 12/340,454, entitled "FEMTO CELL ACCESS POINT PASSTHROUGH MODEL," which claims the benefit of U.S. Provisional Application Ser. No. 61/052,055 filed on May 9, 2008, entitled "FEMTO CELL ACCESS POINT PASSTHROUGH MODEL." These applications are incorporated herein by reference in their entireties.

TECHNICAL FIELD

The subject innovation relates to wireless communications and, more particularly, to prioritization of femto cell traffic relative to disparate concurrent broadband traffic in the absence of an external quality of service implementation.

BACKGROUND

Femto cells—building-based wireless access points interfaced with a wired broadband network—are generally deployed to improve indoor wireless coverage provided by a wireless network operator. Femto cells typically operate in licensed portions of the electromagnetic spectrum, and generally offer plug-and-play installation; e.g., automatic configuration of femto access point. Improved indoor coverage includes stronger signal and improved reception (e.g., voice or sound), ease of session or call initiation and session or call retention as well. Coverage of a femto cell, or femto AP, is intended to be confined within the bounds of an indoor compound, in order to mitigate interference among mobile stations covered by a macro cell and terminals covered by the femto AP. Additionally, confined coverage can reduce crosstalk among terminals serviced by disparate, neighboring femto cells as well.

Coverage improvements via femto cells can also mitigate customer attrition as long as a favorable subscriber perception regarding voice coverage and other data services with substantive delay sensitivity is attained. User positive experience can require an external quality of service (QoS) implementation. While such QoS can supply network resources to meet or exceed customer expectation in connection with voice and data services, it can be costly and incompatible with legacy equipment(s) and service operators of femto and wired broadband networks.

SUMMARY

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject innovation provides system(s) and method(s) to supply fixed, differentiated quality of service (QoS) for packetized traffic (e.g., voice and data) intended for femto cell coverage when transmitted concurrently with external broadband traffic. Quality of Service differentiation is supplied without an external implementation, and takes place in the user plane. Femto cell coverage is prioritized over concurrent packetized traffic to deliver a rich user experience for delay and jitter sensitive applications. A passthrough configuration for a femto access point facilitates supplying hard QoS for data packet streams, or flows, intended for femto cell coverage or non-femto-cell coverage. To at least the latter end, the femto AP receives a consolidated packet stream through backhaul link(s), and utilizes a flow management component to distinguish flow(s) for femto coverage and flow(s) for auxiliary coverage. The flow management supplies, or routes, the flow(s) for devices, mobile or with wireless functionality, covered by the femto cell with hard QoS according to various specifications, which can include operator policy, service agreement(s), promotional campaigns, coverage conditions (e.g., rural deployment, urban deployment, deployment technology, number of subscribers to be covered by the femto cell, applications to be exploited, and so forth). In an aspect, the various specifications can be retained in QoS profile(s). In addition, the flow management component delivers data packet flow(s) to a router that serves one or more devices, stationary or with wireless capability; the data packet flow(s) is delivered with hard QoS of disparate grade, or class, than QoS grade, or class, assigned to femto traffic.

It is noted that aspects, features, or advantages of QoS differentiation effected via a femto AP as described herein can be exploited with substantially any, or any, source of packet-based data or protocol (e.g., internet protocol (IP), asynchronous transfer mode (ATM), frame relay . . . ) for packetized data streams. In addition, QoS differentiation can be implemented for substantially any, or any, radio technology utilized by the femto AP that provides hard QoS for devices served through femto coverage.

The following description and the annexed drawings set forth in detail certain illustrative embodiments of the subject innovation. To facilitate understanding, like reference numerals have been used, where possible, to designate like elements that are common to with the drawings.

DETAILED DESCRIPTION

Figure 1:
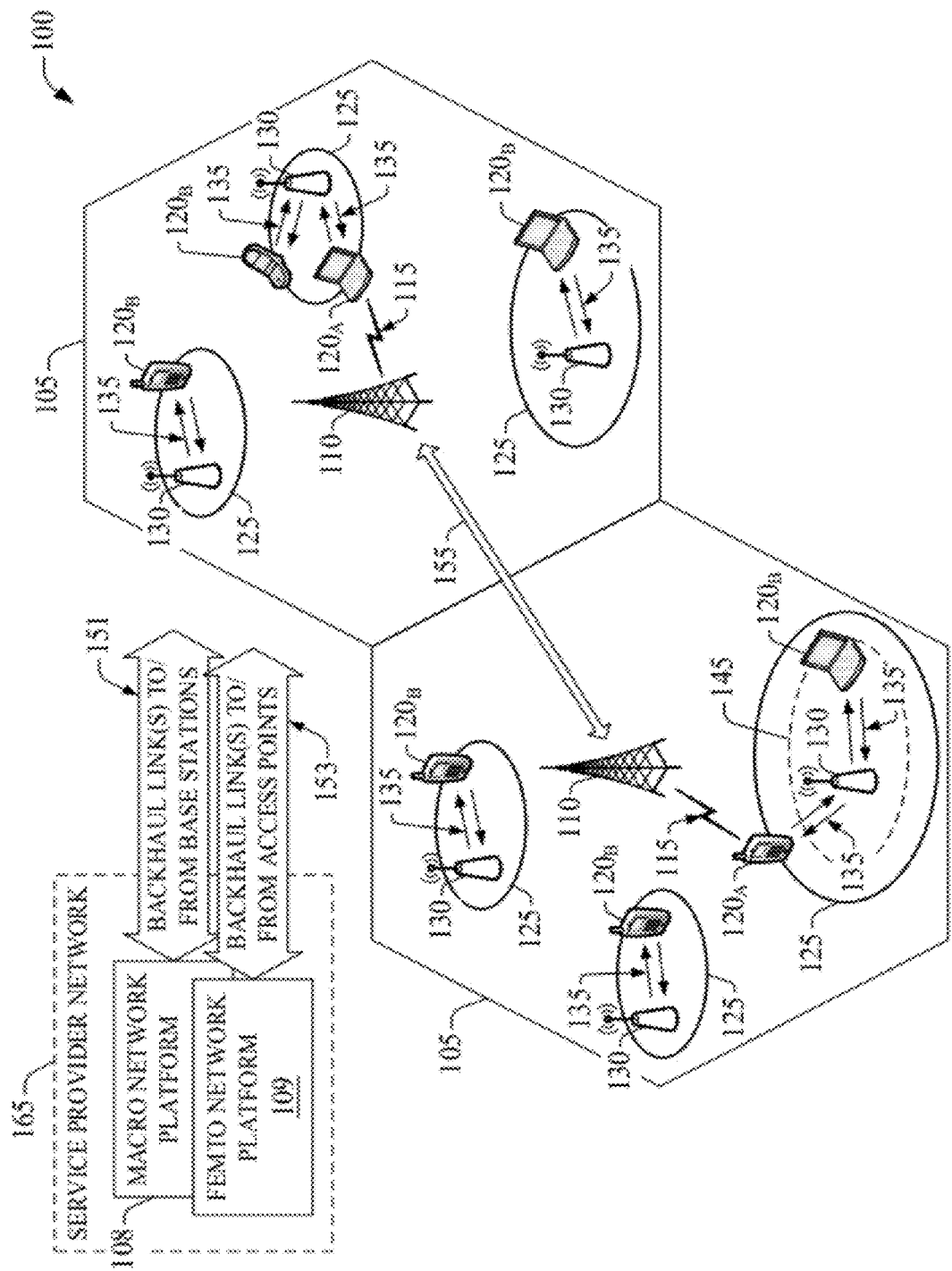
FIG. 1 a schematic deployment of a macro cell and a femto cell for wireless coverage in accordance with aspects described herein.

The subject innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the present invention may be practiced without these specific details. In other instances, well-known structures and devices are shown in block diagram form in order to facilitate describing the present invention.

As used in this application, the terms "component," "system," "platform," "interface" and the like are intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Furthermore, terms like "user equipment," "mobile station," "mobile," subscriber station," "access terminal," "terminal," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "Home Access Point," and the like, are utilized interchangeably in the subject application, and refer to a wireless network component or electronic appliance that serves and receives data, control, voice, video, sound, gaming, or substantially any data-stream or signaling-stream from a set of subscriber stations. Data and signaling streams can be packetized or frame-based flows. In addition, the terms "femto cell access point" and "femto access point" are utilized interchangeably.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms) which can provide simulated vision, sound recognition and so forth.

Referring to the drawings, FIG. 1 illustrates a wireless environment that includes macro cells and femto cells for wireless coverage in accordance with aspects described herein. In wireless environment 100, two areas 105 represent "macro" cell coverage; each macro cell is served by a base station 110. It should be appreciated that macro cells 105 are illustrated as hexagons; however, macro cells can adopt other geometries generally dictated by the deployment or floor plan, geographic areas to be covered (e.g., a metropolitan statistical area (MSA) or rural statistical area (RSA)), and so on. Macro coverage is generally intended to serve mobile wireless devices, like UE $120_A$, in outdoors locations. An over-the-air wireless link 115 provides such coverage; the wireless link 115 comprises a downlink (DL) and an uplink (UL), and utilizes a predetermined band of the radio frequency (RF) spectrum. As an example, UE $120_A$ can be a Third Generation Partnership Project (3GPP) Universal Mobile Telecommunication System (UMTS) mobile phone. It is noted that a base station, its associated electronics, circuitry or components, and a wireless link operated in accordance to the base station form a radio access network (RAN). In addition, base station 110 communicates via backhaul link(s) 151 with a macro network platform 108, which in cellular wireless technologies (e.g., 3rd Generation Partnership Project (3GPP) Universal Mobile Telecommunication System (UMTS), Global System for Mobile Communication (GSM)) represents a core network. In an aspect, macro network platform 108 controls a set of base stations 110 that serve either respective cells or a number of sectors within such cells. Macro network platform 108 also communicates with other base stations (not shown) that serve other cells (not shown). Backhaul link(s) 151 can include a wired backbone link (e.g., optical fiber backbone, twisted-pair line, T1/E1 phone line, a digital subscriber line (DSL) either synchronous or asynchronous, an asymmetric ADSL, or a coaxial cable . . . ). Backhaul pipe(s) 155 link disparate base stations 110.

In wireless environment 100, within one or more macro coverage cell 105, a set of femto cell 125 served by respective femto access points (APs) 130 can be deployed. While in illustrative wireless environment 100 three femto cells are deployed per macro cell, aspects of the subject innovation are geared to femto cell deployments with substantive femto AP density, e.g., $10^4$-$10^8$ femto APs 130 per base stations 110. A femto cell 125 typically covers an area that includes confined area 145, which is determined, at least in part, by transmission power allocated to femto AP 130, path loss, shadowing, and so forth. While coverage area 125 and confined area 145 typically coincide, it should be appreciated that in certain deployment scenarios, coverage area 125 can include an outdoor portion (e.g., a parking lot, a patio deck, a recreation area such as a swimming pool and nearby space) while area 145 spans an enclosed living space. Coverage area typically is spanned by a coverage radius that ranges from 20 to 100 meters. Confined coverage area 145 is generally associated with an indoor space such as a building, either residential (e.g., a house, a condominium, an apartment complex) or business (e.g., a library, a hospital, a retail store), which encompass a setting that can span about 5000 sq. ft.

A femto AP 130 typically serves a few (for example, 1-5) wireless devices (e.g., subscriber station $120_B$) within confined coverage area 125 via a wireless link 135 which encompasses a downlink and an uplink. A femto network platform 109 can control such service, in addition to mobility handover from macro-to-femto handover and vice versa, and registration and provisioning of femto APs. Control, or management, is facilitated by backhaul link(s) 153 that connect deployed femto APs 130 with femto network platform 109. Backhaul pipe(s) 153 are substantially the same as backhaul link(s) 151. In an aspect of the subject innovation, part of the control effected by femto AP 130 measurements of radio link conditions and other performance metrics. Femto network platform 109 also includes components, e.g., nodes, gateways, and interfaces, that facilitates packet-switched (PS) (e.g., internet protocol (IP), ATM, frame relay . . . ) traffic and signaling generation for networked telecommunication. It should be appreciated that femto network platform 109 can be femto AP 130 can integrate seamlessly with substantially any packet switched (PS)-based and circuit switched (CS)-based network such as macro network platform 108. Thus, operation with a wireless device such as $120_A$ is substantially straightforward and seamless when handover from femto-to-macro, or vice versa, takes place. As an example, femto AP 130 can integrate into an existing 3GPP Core Network via conventional interfaces, or reference links, such as Iu-CS, Iu-PS, Gi, or Gn.

It is to be noted that substantially all voice or data active sessions associated with subscribers within femto cell coverage (e.g., area 125) are terminated once the femto AP 130 is shut down; in case of data sessions, data can be recovered at least in part through a buffer (e.g., a memory) associated with a femto gateway at the femto network platform. Coverage of a suspended or hotlined subscriber station or associated account can be blocked over the air-interface. However, if a suspended or hotlined customer who owns a femto AP 130 is in Hotline/Suspend status, there is no substantive impact to the customers covered through the subject femto AP 130. In another aspect, femto AP 130 can exploit high-speed downlink packet access either via an interface with macro network platform 108 or through femto network platform 109 in order to accomplish substantive bitrates.

In addition, in yet another aspect, femto AP 130 has a LAC (location area code) and RAC (routing area code) that is different from the underlying macro network. These LAC and RAC are used to identify subscriber station location for a variety of reasons, most notably to direct incoming voice and data traffic to appropriate paging transmitters, and emergency calls as well. As a subscriber station (e.g., UE $120_A$) that exploits macro coverage (e.g., cell 105) enters femto coverage (e.g., area 125), the subscriber station (e.g., UE $120_A$) attempts to attach to the femto AP 130 through transmission and reception of attachment signaling. The signaling is effected via DL/UL 135; in an aspect of the subject innovation, the attachment signaling can include a Location Area Update (LAU) and/or Routing Area Update (RAU). Attachment attempts are a part of procedures to ensure mobility, so voice calls and data sessions can continue even after a macro-to-femto transition or vice versa. It is to be noted that UE $120_A$ can be employed seamlessly after either of the foregoing transitions. In addition, femto networks typically are designed to serve stationary or slow-moving traffic with reduced signaling loads compared to macro networks. A femto service provider network 165 (e.g., an entity that commercializes, deploys, or utilizes femto access point 130) is therefore inclined to minimize unnecessary LAU/RAU signaling activity at substantially any opportunity to do so, and through substantially any available means. It is to be noted that substantially any mitigation of unnecessary attachment signaling/control is advantageous for femto cell operation. Conversely, if not successful, UE $120_A$ is generally commanded (through a variety of communication means) to select another LAC/RAC or enter "emergency calls only" mode. It is to be appreciated that this attempt and handling process can occupy significant UE battery, and femto AP capacity and signaling resources (e.g., communication of pilot sequences) as well.

When an attachment attempt is successful, UE $120_A$ is allowed on femto cell 125, and incoming voice and data traffic are paged and routed to the subscriber through the femto AP 130. To facilitate voice and data routing, and control signaling as well, successful attachment can be recorded in a memory register, e.g., a Visited Location Register (VLR), or substantially any data structure stored in a network memory. It is to be noted also that packet communication (e.g., voice and data traffic, and signaling) typically paged/routed through a backhaul broadband wired network backbone 140 (e.g., optical fiber backbone, twisted-pair line, T1/E1 phone line, digital subscriber line (DSL) either synchronous or asynchronous, an asymmetric DSL, a coaxial cable . . . ). To this end, femto AP 130 is typically connected to the broadband backhaul network backbone 140 via a broadband modem (not shown). In an aspect of the subject innovation, femto AP 130 can display status indicators for power, active broadband/DSL connection, gateway connection, and generic or specific malfunction. In another aspect, no landline is necessary for femto AP 130 operation.

It is to be noted that as a femto AP 130 generally relies on a backhaul network backbone for routing and paging, and for packet communication, it can handle heterogeneous packetized traffic, or packetized data streams, such as packet flows established for wireless devices served by femto AP 130, and for devices served through the backhaul network pipe, broadband connection. It should be appreciated that to ensure a positive subscriber experience, or perception, it is important for femto AP 130 to maintain a high level of throughput for traffic (e.g., voice and data) utilized on a mobile device for one or more subscribers while in the presence of external, additional packetized, or broadband, traffic associated with applications (web browsing, data transfer (e.g., content upload), or the like) executed in devices within the femto coverage area (e.g., either area 125 or area 145). An example system that provides fixed QoS for femto cell traffic in the presence of disparate broadband traffic is discussed next.

Figure 2:
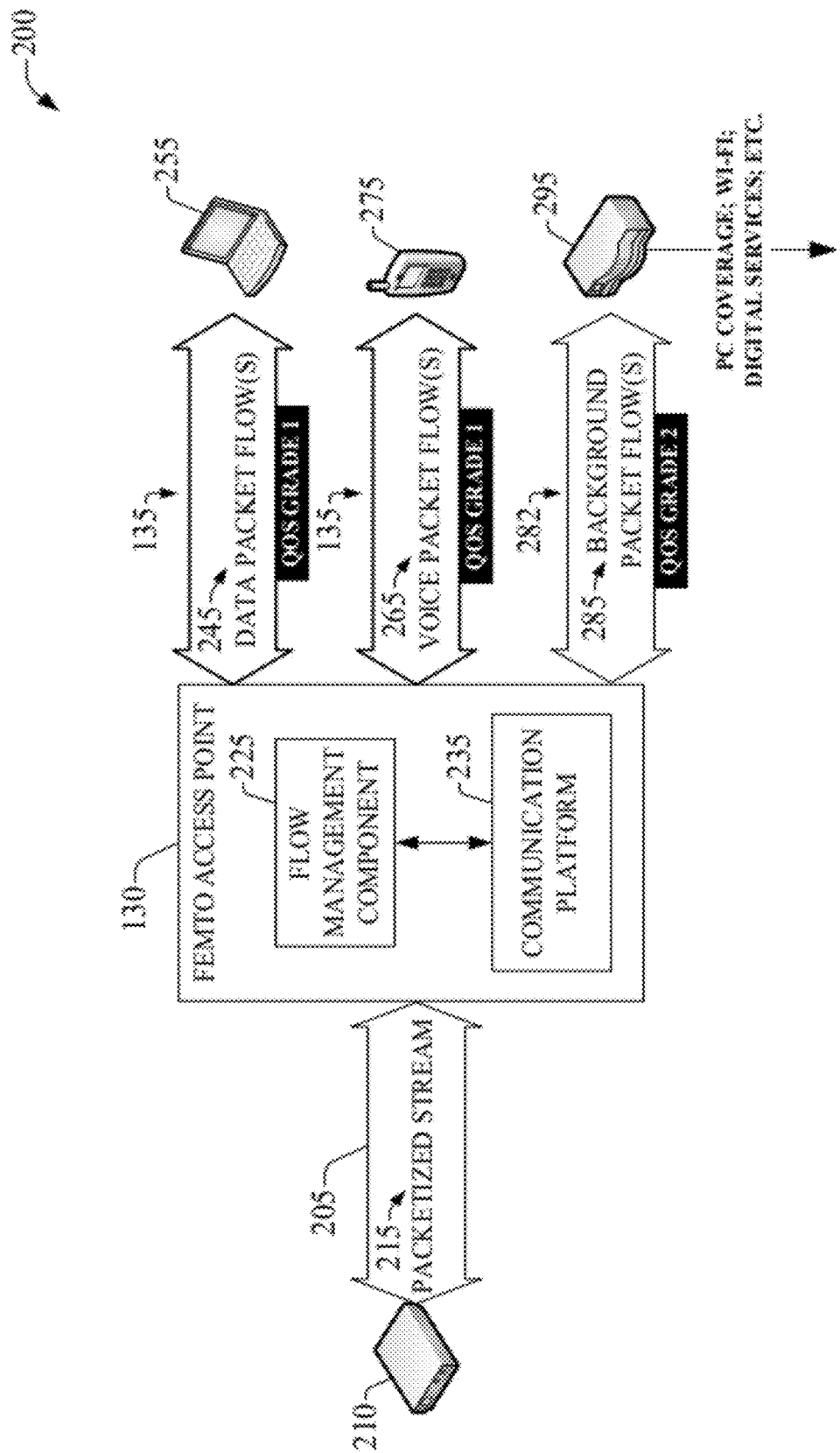
FIG. 2 is a block diagram of an example system that provides prioritized hard QoS to data stream(s) directed to wireless device(s) served by a femto with respect to supplied hard QoS to external concurrent broadband traffic in accordance with aspects disclosed herein.

FIG. 2 is a block diagram of an example system 200 that provides fixed, differentiated QoS for femto cell traffic (e.g., voice and data) and disparate concurrent broadband traffic in accordance with aspects described herein. Quality of service (QoS) as provided by the aspects of the subject innovation does not rely on a QoS implementation external to the femto cell (e.g., a QoS implementation provided through femto network platform 190, or a broadband network that provides the concurrent broadband traffic), which mitigates legacy issues with equipment and implementations since disparate packet protocol(s), multiplexing, modulation and coding rates are processed at the femto AP regardless the source of data packet flow(s). Incompatibility among operators' interests as well. It is noted that, in an aspect of the subject innovation, differentiated QoS takes place in the user plane. Example system 200 embodies a "femto access point passthrough configuration" in which broadband modem 210, or substantially any other device that conveys data from a broadband backhaul backbone (e.g., backhaul link(s) 153), conveys a packetized stream 215 over backhaul pipe segment 205 to femto AP 130, which discriminates the received stream into a first set of flows (e.g., data packet flow(s) 245 intended for a wireless device 255, or voice packet flow(s) 265 associated with subscriber station 275) for femto coverage, and a second set of flows associated with background, or external to femto, concurrent broadband traffic (e.g., background packet flow(s) 285) intended for a router/hub 295, or substantially any other connection or device, that delivers coverage for personal computer (PC), a Wireless Fidelity (Wi-Fi) access point, digital service(s) such as digital media frame, or the like. Packet flow(s) directed to femto coverage are delivered, and received, over wireless link 135, whereas background packet flow(s) 285 can be delivered over a wired link 282. In an aspect of the subject innovation, femto cell coverage (e.g., data packet flow(s) 245 and voice packet flow(s) 265) is prioritized over concurrent packetized traffic in order to deliver a rich user experience for delay and jitter sensitive applications such as realtime or streaming applications; for instance, both data packet flow(s) 245 and voice packet flow(s) 265 can receive a QoS Grade 1 with packet(s) prioritized over Grade 2 background packet flow(s) 285. It should be appreciated that most any, or any, QoS categorization such as Class of Service can be employed to distinguish among QoS profiles for packet flow(s) directed to femto coverage or packet flow(s) directed to background broadband coverage.

In an aspect, to facilitate flow discrimination and QoS provision without reliance on external QoS implementation, femto AP 130 includes a flow management component 225. Quality of service provision can be based at least in part on generalized traffic shaping, e.g., mechanism(s) to retain, preempt, cache, or dynamically reformat received packet data flows. Supplied fixed QoS for packet flow(s) communicated to devices covered by femto AP 130, and associated priority with respect to background packetized traffic, can be dictated in accordance at least in part with various specifications that can comprise operator policy, service agreement(s), promotional campaigns, coverage conditions (e.g., rural deployment, urban deployment, deployment technology, number of subscribers to be covered by the femto cell, applications to be exploited, available bandwidth . . . ) and so forth. In another aspect, such specification(s) can be stored in a memory component within flow management 225 or functionally coupled thereto. Such specifications can embody a QoS policy. Substantially all communication (e.g., transmission/reception of packet flows) is administered by communication platform 235, which generally comprises one or more components, including a processing unit (not shown) and a memory element (not shown) that facilitate wireless and wired communication. Next, a schematic representation of traffic in the femto AP passthrough" configuration and associated QoS, as well as aspects of system 200 are described in greater detail.

Figure 3:
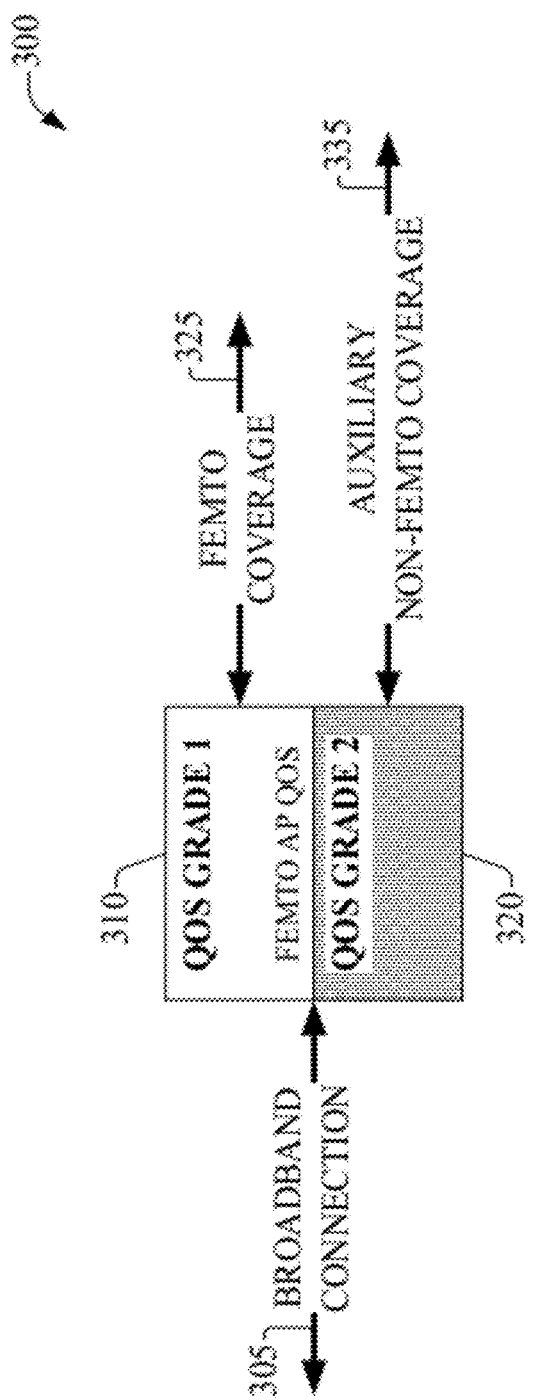
FIG. 3 illustrates a sketch of traffic in a femto cell with fixed QoS in accordance with aspects disclosed herein.

FIG. 3 is a diagram 300 of an illustrative example "femto AP passthrough" traffic configuration in a femto cell with fixed QoS in accordance with aspects disclosed herein. As discussed above, broadband connection 305 communicates traffic to a femto cell (e.g., femto AP 130) which supplies a first fixed QoS 310 for a portion of the received traffic that is intended for femto coverage 325. Such portion of traffic is delivered wirelessly. In addition, a remaining portion of the concurrent incoming traffic intended for devices served through backhaul pipe coverage, and delivered via broadband connection 305, can be can be conveyed to devices, stationary or mobile, that are served through auxiliary non-femto coverage 335. In an aspect, the remaining portion of the concurrent traffic can be received by a broadband hub or router, which can include wired or wireless port(s), or other connector such as a Wi-Fi access point or a specific device (e.g., server, an IP television set, a wireless digital media frame . . . ), associated with broadband connection 305. As an illustration, provided QoS for femto coverage 325 can be Grade 1 with packet priority over a Grade 2 QoS 320 for auxiliary, or background, non-femto traffic 335. Herein, Grade 1 QoS 310 is an improved quality of service over Grade 2 QoS 320.

Figure 4:
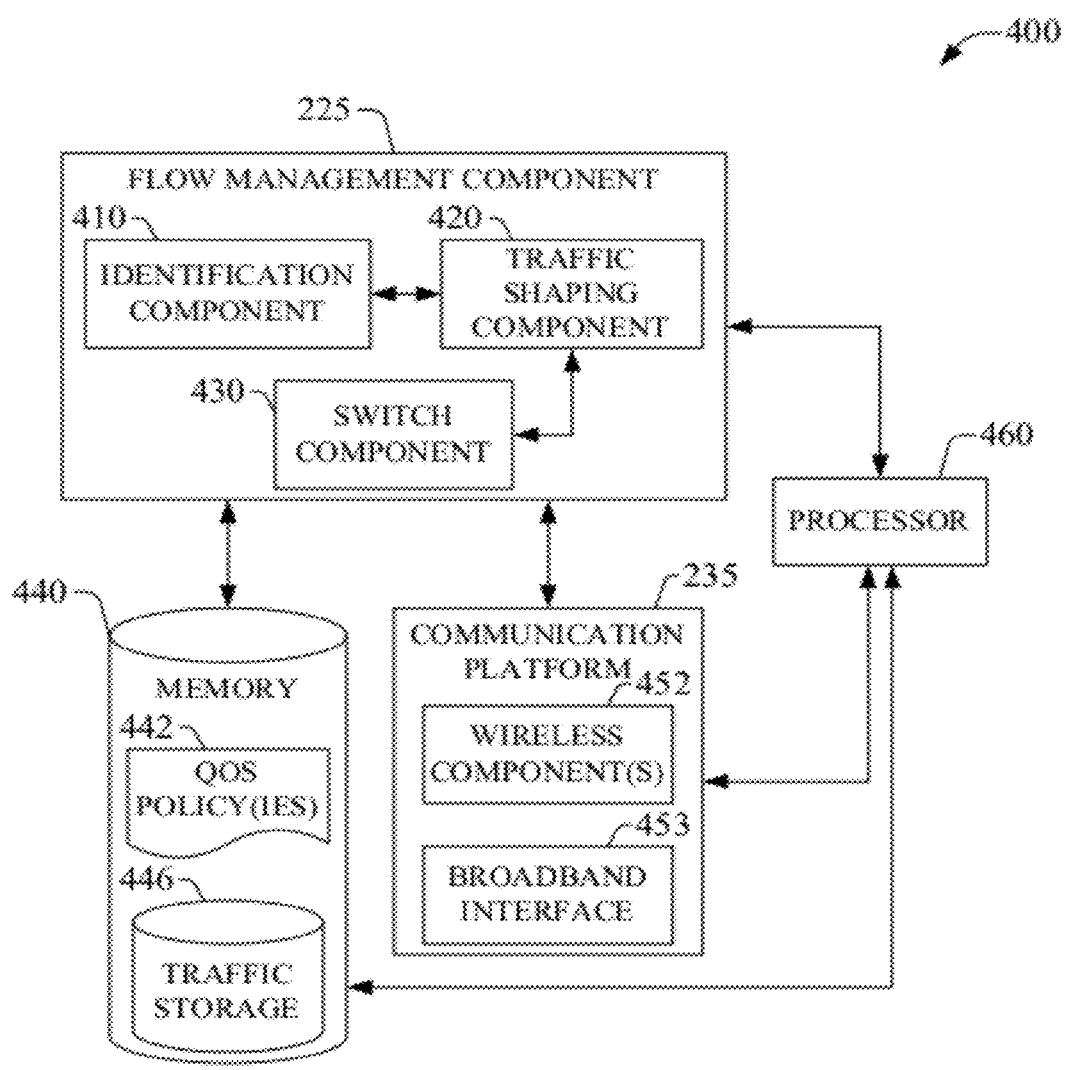
FIG. 4 is a block diagram of an example embodiment of a flow management component in accordance with aspects described herein.

FIG. 4 is a block diagram of an example embodiment 400 of a flow management component in accordance with aspects described herein. Flow management component 225 includes an identification component 410 that discriminates between data packet flows directed to femto cell coverage and those directed to broadband coverage (e.g., data packets intended for a router, hub, non-femto access point, device(s), or the like). Identification component 410 provides discriminated packet traffic, e.g., femto and non-femto, to traffic shaping component 420 which can process data packet flows based at least in part on mechanism(s) to retain, preempt, cache (e.g., in traffic storage 446), or dynamically reformat received packet data flows, and thereby supply, or provide, data streams with fixed QoS. It should be appreciated that part of the mechanism(s) can include evaluation of radio link condition(s) or wireless link 135, and evaluation of other available resources such as radio technologies, radio frequency carriers and so on. Traffic shaping component 420 also can exploit at least in part a QoS policy stored in memory element QoS policy(ies) 442 to determine one or more fixed QoS profile, or realization, and supply the femto and non-femto data stream with a determined QoS profile. A QoS policy can be defined by a network operator and received from a mobile network element (e.g., a femto gateway node) at the time of provisioning the femto AP that exploits flow management component 225 for QoS differentiation as described herein. In addition, a QoS policy can be received on an event-driven basis, wherein new QoS policies are received when broadband backhaul backbone is upgraded (e.g., bandwidth increase as a result of replacement of T-carrier(s) with optical fiber, or upgrade of optical fiber material(s) to a material with lower transmission losses . . . ), a new radio technology for femto communication is deployed, or a new frequency carrier is include communication. A QoS policy can adopt default QoS profiles, or realization, with predetermined Grade of Service, or Class of Service, or specific guaranteed packet rates, packet loss rates, maximum packet error rates, maximum block error rates or the like. In an aspect, different default profiles can be determined for various application or devices that consume one or more of the data flows. It is noted that a QoS policy can be effected for all devices authorized to access femto service, as dictated by a configurable access list(s).

Packetized data flows intended for femto coverage and broadband coverage (e.g., non-femto) are conveyed to switch component 430 that routes femto packetized flow(s) to wireless communication component(s), or wireless component(s) 452, within communication platform 235 for delivery over-the-air to one or more intended wireless devices (e.g., wireless computer 255, or UE 275), and non-femto packetized flow(s) to broadband interface 453 within communication platform 235 for delivery through a broadband link (e.g., link 282) to router/hub 295.

Processor 460 can be configured to confer, and can confer, at least in part, the described functionality of flow management component 225 and components therein, or can execute one or more of the component(s) in embodiment 400. To at least the foregoing ends, processor 460 can execute code instructions or program modules stored in a memory (e.g., memory 440) functionally coupled to flow management component 225, and exploit related data structures (e.g., objects, classes).

Figure 5:
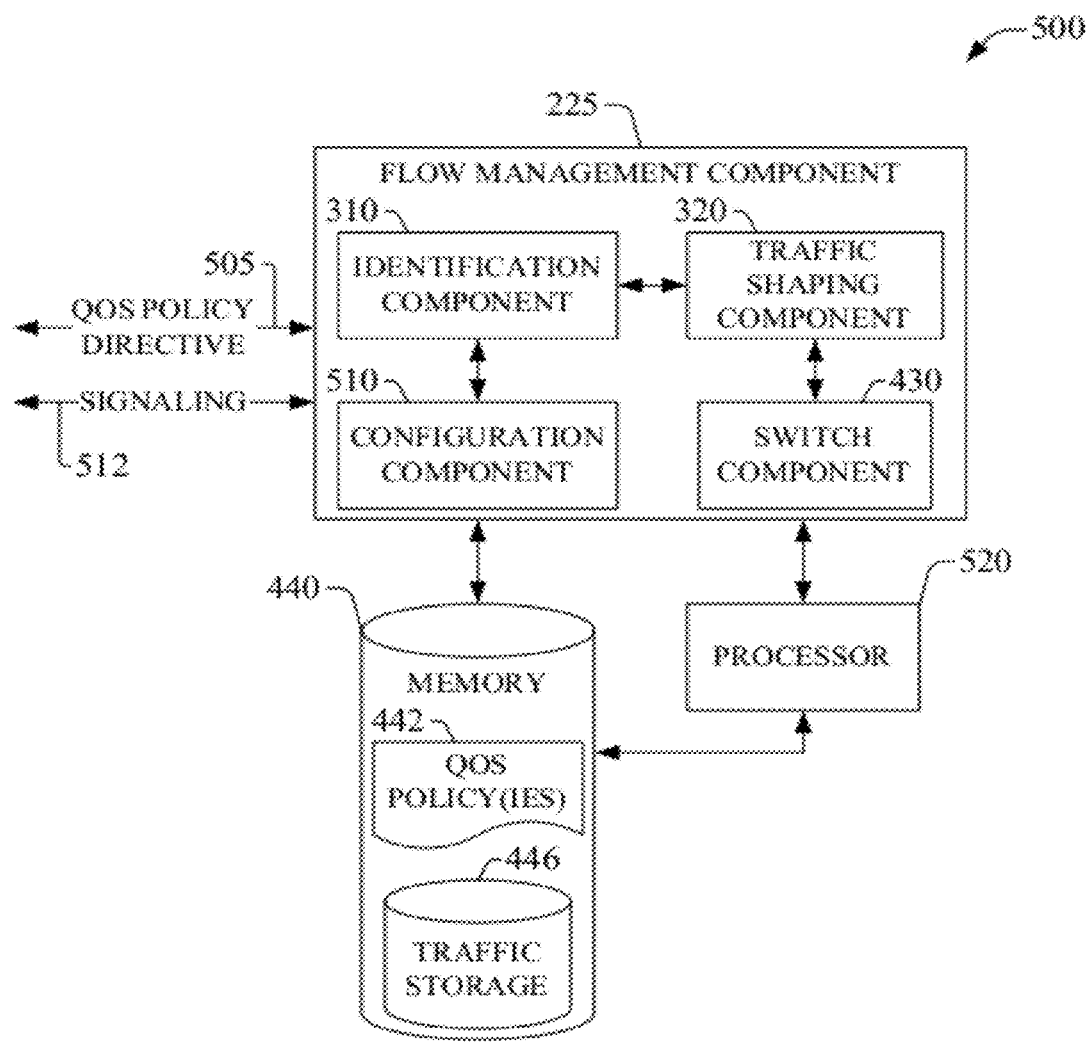
FIG. 5 is a block diagram of an example embodiment of a flow management component that facilitates configuration of a QoS policy in accordance with aspects described herein.

FIG. 5 is a block diagram of an example embodiment 500 of a flow management component that facilitates configuration of a QoS policy in accordance with aspects described herein. As described above, QoS policy(ies) 442 can be defined by a network operator and received from a mobile network element at the time of provisioning a femto AP or an event-driven basis; for instance, new QoS policies are received when broadband backhaul backbone is upgraded (e.g., bandwidth increase as a result of replacement of T-carrier(s) with optical fiber, or upgrade of optical fiber material(s) to a material with lower transmission losses . . . ). In an aspect of the subject innovation, QoS policy also can be configured at least in part by a subscriber. Example embodiment 500, through at least configuration component 510, facilitates subscriber-based configuration of a QoS policy. Configuration can include at least one of generation of a new QoS policy or modification of an existing QoS policy. In an aspect, a QoS policy directive 505 can be received by configuration component 510 as a part of composition of QoS policy. Such a directive can enter a QoS requirement for at least one of an application or a subscriber station. In addition, QoS policy directive 505 can remove extant QoS requirements from QoS policy(ies) 442.

It is noted that a QoS policy requirement, or entry, is a criterion to set a specific QoS under predetermined circumstances, and a QoS profile, or realization, associated with the criterion. In an aspect, a QoS policy requirement can be received from a subscriber via a short message service (SMS) communication, an unstructured supplementary service data (USSD) message, or an email communication. Server(s) in a mobile network component can administer such communication(s) and deliver associate content(s). In another aspect, configuration component 510 can prompt, through signaling 512, a subscriber to enter a QoS policy directive when a new mobile device is authorized to exploit femto coverage, as reflected by changes to access list(s). Signaling 512 can be embodied in a SMS communication, a USSD message, or an email communication to a mobile device of a subscriber associated with femto AP 130 and identified as responsible for the account related to femto service. Alternatively, or additionally, signaling 512 can trigger visual or aural indicia in a display interface for femto AP. In yet another aspect, configuration component 510 can ensure normalization of requested QoS requirements within a QoS policy to ensure requested QoS profiles, or realizations, can be supplied. Normalization herein refers to congruency among available communication resources and required QoS profiles in a QoS requirement or QoS policy. Normalization can proceed through evaluation, e.g., via measurement(s) and estimate(s), of available resources (e.g., capacity available within femto coverage area, UL and DL radio quality, allocated radiating power . . . ) and estimation of required resources needed to meet requested QoS profiles. When a QoS policy fails to be normalized, e.g., include QoS requirements that cannot be fulfilled, at least one of the following is effected: an indication is delivered to a subscribed responsible for the account associated with the femto AP that operates in passthrough configuration or a default QoS, or a normalized default QoS is adopted.

Processor 520 can be configured to confer, and can confer, at least in part, the described functionality of flow management component 225 and components therein, or can execute one or more of the component(s) in embodiment 500. To at least the foregoing ends, processor 460 can execute code instructions or program modules stored in a memory (e.g., memory 440) functionally coupled to flow management component 225, and exploit related data structures (e.g., objects, classes).

Figure 6:
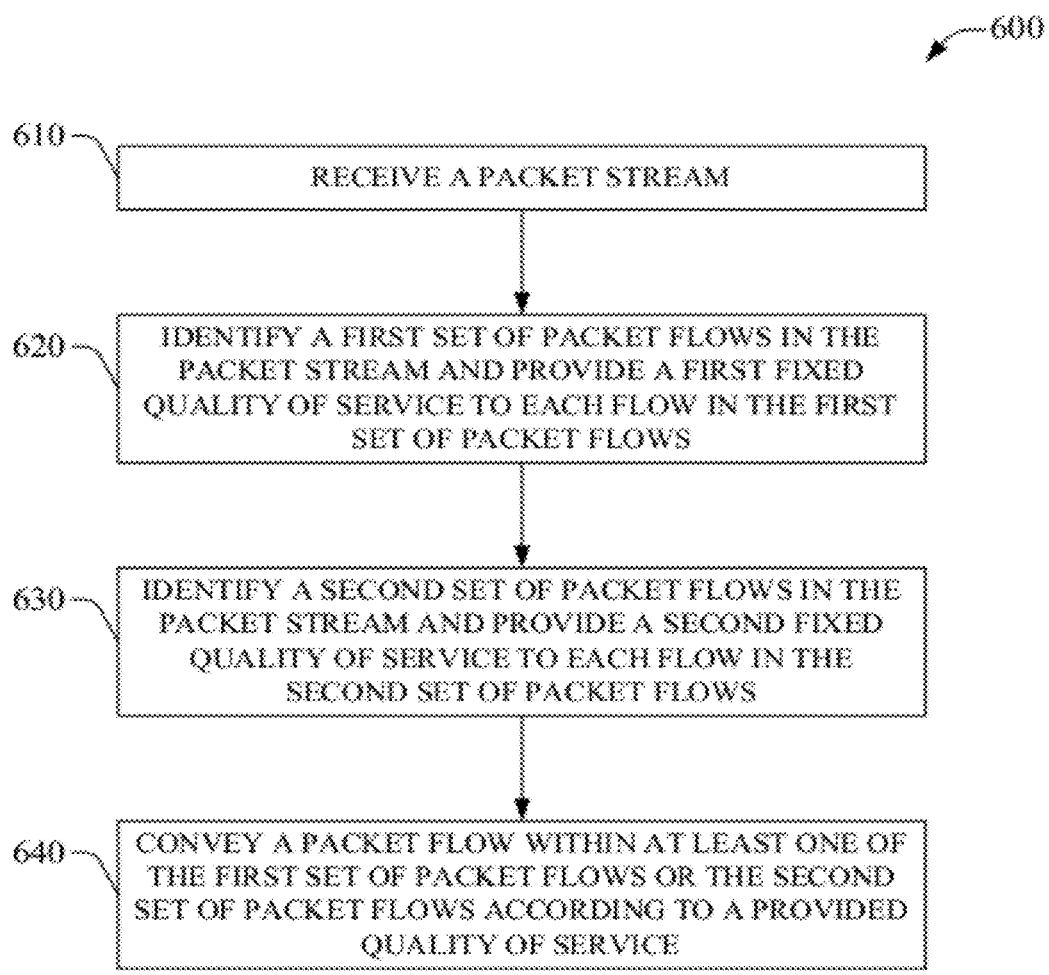
FIG. 6 presents a flowchart of an example method for providing differentiated QoS for femto cell traffic in the presence of disparate broadband traffic in accordance to aspects described in the subject specification.
Figure 7:
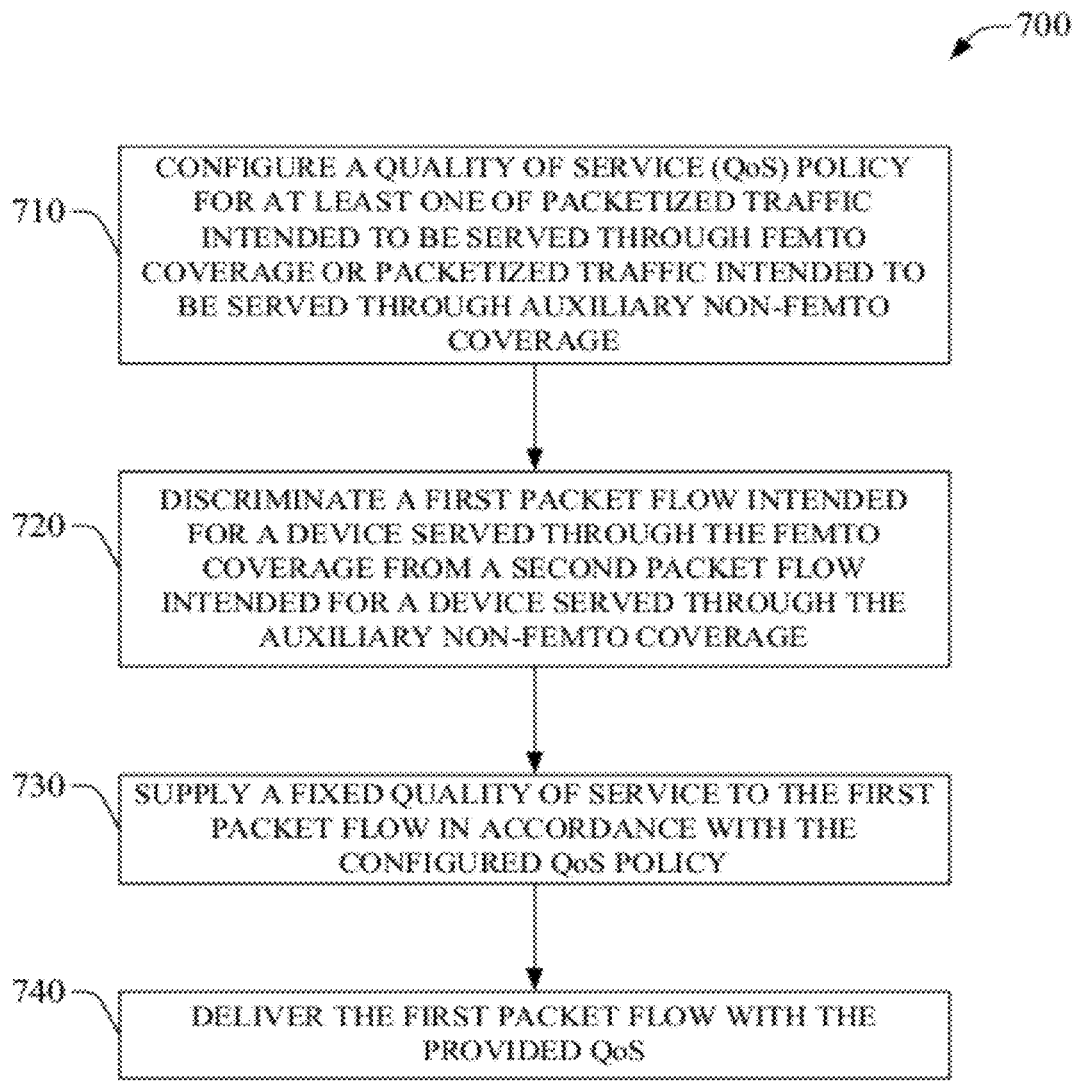
FIG. 7 is an example method for delivering a data packet flow with a QoS based at least in part on a QoS policy according to aspects described herein.
Figure 8:
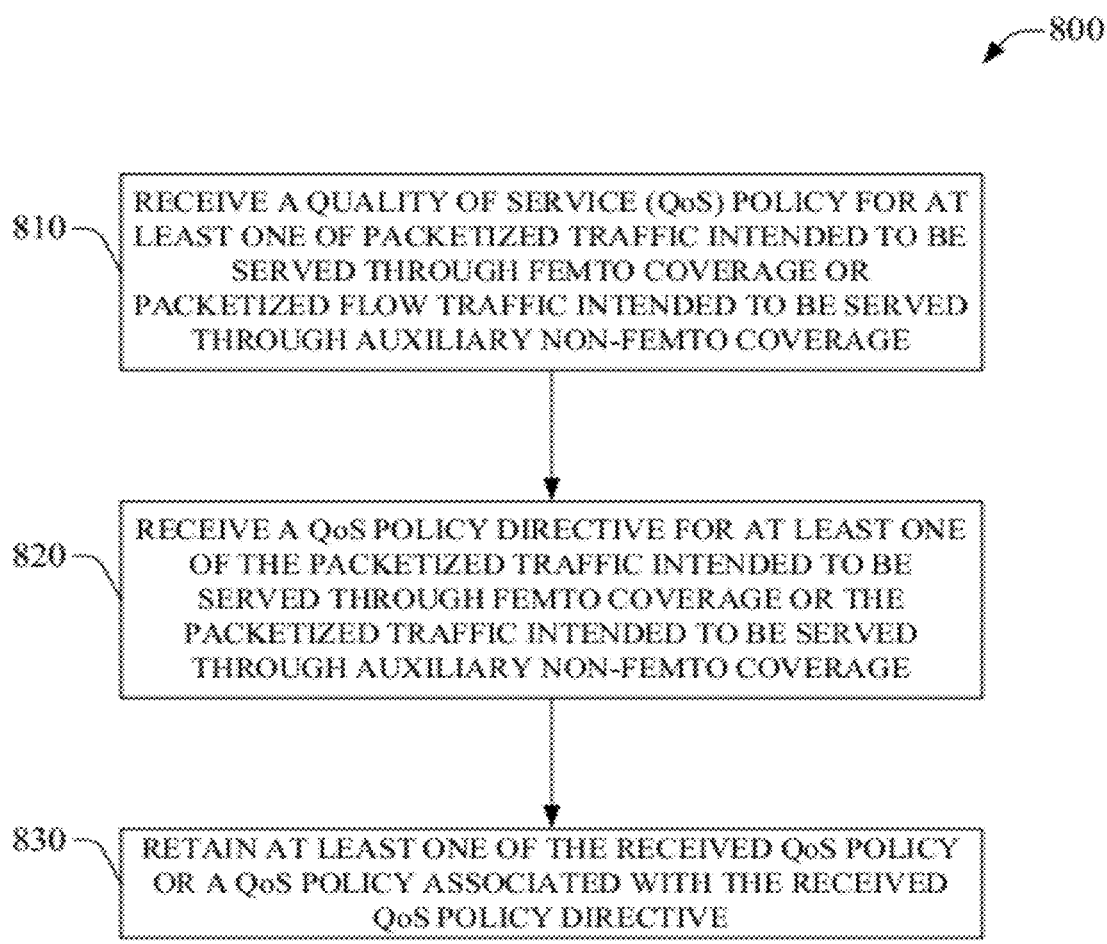
FIG. 8 is an example method for configuring at least in part a QoS policy for differentiated prioritization of packetized data streams directed to femto coverage and packetized data streams directed to broadband coverage.

In view of the example systems described above, example methodologies that can be implemented in accordance with the disclosed subject matter can be better appreciated with reference to flowcharts in FIGS. 6-8. For purposes of simplicity of explanation, example methodologies disclosed herein are presented and described as a series of acts; however, it is to be understood and appreciated that the claimed subject matter is not limited by the order of acts, as some acts may occur in different orders and/or concurrently with other acts from that shown and described herein. For example, a methodology disclosed herein could alternatively be represented as a series of interrelated states or events, such as in a state diagram or call flow. Moreover, interaction diagram(s) may represent methodologies in accordance with the disclosed subject matter when disparate entities enact disparate portions of the methodologies. Furthermore, not all illustrated acts may be required to implement a methodology in accordance with the subject specification. Further yet, two or more of the disclosed methodologies can be implemented in combination with each other, to accomplish one or more features or advantages herein described. It should be still further appreciated that the methodologies disclosed hereinafter and throughout this specification are capable of being stored on an article of manufacture to facilitate transporting and transferring such methodologies to computers for execution, and thus implementation, by a processor or for storage in a memory.

FIG. 6 is a flowchart of an example method 600 for supplying fixed QoS for flows served by a femto cell in the presence of disparate broadband traffic according to aspects described herein. In an aspect, it is to be noted that the subject example method 600 can be carried out by a femto cell access point within a passthrough configuration (see FIGS. 2 and 3). In another aspect, performing example method 600 can benefit aspects of QoS of a femto cell like mitigation of bottlenecks, or congestion, in traffic delivery for femto cell application(s) and subscriber. With respect to flowchart of example method 600, at act 610 a packet stream is received. The packet stream is a user-plane packetized data stream. In an aspect, such packet stream can be comprised by multiple flows associated with various applications executed in (i) wireless device(s) served by a femto cell and (ii) device(s), wired or with wireless capabilities, served through a broadband backhaul network. At act 620, a first set of packet flows in the data stream is identified and a first fixed QoS is provided, or assigned, to each flow in the set first set. It should be appreciated that the first set includes one or more packet flows. In another aspect, packet flows in the first set can be voice and data packet flows intended for wireless device(s) served by a femto cell. It is noted that assigned first QoS can be same for each flow. Providing the first fixed QoS can include processing each flow in the first set of packet flows based at least in part on mechanism(s) to retain, preempt, cache, or dynamically reformat received packet data flows. It should be appreciated that part of the mechanism(s) can include evaluation of radio link condition(s) or wireless link 135, or evaluation of other available resources such as capacity of a femto coverage area, radio technologies, radio frequency carriers and associated bandwidth, and so on. At act 630, a second set of flows in the data stream is identified and a second QoS is provided, or assigned, to each flow in the second flow. It is noted that assigned second QoS can be same for each flow. In yet another aspect, traffic in the second set of flows can correspond to non-femto broadband traffic intended for disparate devices either wireless (e.g., a cordless phone, a wireless monitor) or wired (e.g., a television (TV) set such as an IPTV set, a personal computer, a smart panel like a message board, and the like) served through a backhaul network pipe, or backbone. Providing the second fixed QoS can include processing each flow in the first set of packet flows based at least in part on mechanism(s) to retain, preempt, cache, or dynamically reformat received packet data flows. At act 640, a packet flow within at least one of the first set of packet flows or the second set of packet flows is conveyed according to a respectively provided QoS (e.g., first QoS, or second QoS). In an aspect, as part of packet flow delivery, a component (e.g., switch component 430) routes the packet flow to either a communication platform for wireless delivery, or a broadband interface for delivery through an auxiliary broadband connection for non-femto coverage (see FIGS. 2-3).

A network operator can determine either the first QoS or the second QoS, or both, based at least in part on at least one of operator policy; service agreement(s), such as a business subscriber with substantive voice and data consumption, or residential customer with modest voice and data consumption; promotional campaigns which can supply premium QoS, such as high guaranteed packet rate or guaranteed packet loss, for predetermined time intervals or in exchange for selected product of service purchases; or coverage conditions (e.g., rural deployment, urban deployment, deployment radio technology, number of subscribers to be covered by a femto cell, applications to be exploited, and so forth). Determination of first QoS and second QoS establish relative priority of data flow delivery. It should be appreciated that substantially any QoS categorization such as Grade of Service, Class of Service, guaranteed bitrate, guaranteed packet rate, maximum packet loss rate, maximum block error rate, etc. can be utilized to assign the first and second QoS and thus their respective prioritization.

FIG. 7 is an example method 700 for delivering a data packet flow with a QoS based at least in part on a QoS policy according to aspects described herein. A femto AP or one or more components therein (e.g., a flow management component 225) can effect the subject example method. In an aspect, a processor that confers, at least in part, the functionality of the one more components also can enact this example method 700. At act 710, a QoS policy is configured for at least one of packetized traffic intended to be served through femto coverage or packetized flow traffic intended to be served through auxiliary non-femto coverage. In an aspect, auxiliary non-femto coverage is provided through connection to a broadband traffic router (e.g., external to the femto AP that implements the subject example method. At act 720, a first packet flow intended for a device, either mobile or with wireless capability, served through femto coverage from a second packet flow intended for a device served through the femto coverage is discriminated from a second packet flow intended for a device, wired or with wireless capability, served through the auxiliary non-femto coverage. At act 730, a fixed QoS is supplied to the first packet flow in accordance with the configured QoS policy. At act 740, the first packet flow is delivered with the supplied QoS. Delivery of the first packet flow with the supplied QoS includes routing the first packet flow to communication platform (e.g., communication platform 235).

FIG. 8 is an example method 800 for configuring at least in part a QoS policy for differentiated prioritization of packetized data streams directed to femto coverage and packetized data streams directed to broadband coverage. A femto AP or one or more components therein (e.g., configuration component 510) can effect the subject example method. In an aspect, a processor that confers, at least in part, the functionality of the one more components also can enact this example method 800. At act 810 a QoS policy is received for at least one of packetized traffic intended to be served through femto coverage or packetized traffic intended to be served through auxiliary non-femto coverage. In an aspect, the QoS policy can be defined by a network operator and received from a mobile network element (e.g., a femto gateway node) at the time of provisioning the femto AP that enacts the subject example method 800. In addition, a QoS policy can be received on an event-driven basis, wherein new QoS policies are received when broadband backhaul backbone is upgraded (e.g., bandwidth increase as a result of replacement of T-carrier(s) with optical fiber, or upgrade of optical fiber material(s) to a material with lower transmission losses . . . ). At act 820, a QoS policy directive is received for at least one of the packetized traffic intended to be served through femto coverage or the packetized traffic intended to be served through auxiliary non-femto coverage. In an aspect, a QoS policy directive can enter a QoS requirement for at least one of an application or a subscriber station. In addition, a QoS policy directive can remove extant QoS requirements from stored QoS policy(ies) 442. At act 830, at least one of the received QoS policy or a QoS policy associated with the received QoS policy directive is retained. Retaining a QoS policy associated with the QoS policy directive can include adding a QoS requirement to an existing QoS policy as a result of effecting the received QoS directive; for instance, when a new data application becomes available to be served through femto coverage, a specific QoS can be configured for such application. In addition, retaining at least one of the received QoS policy or a QoS policy associated with the received QoS policy directive can include validating the QoS policy to be retained is normalized, where normalization has been described hereinbefore.

Figure 9:
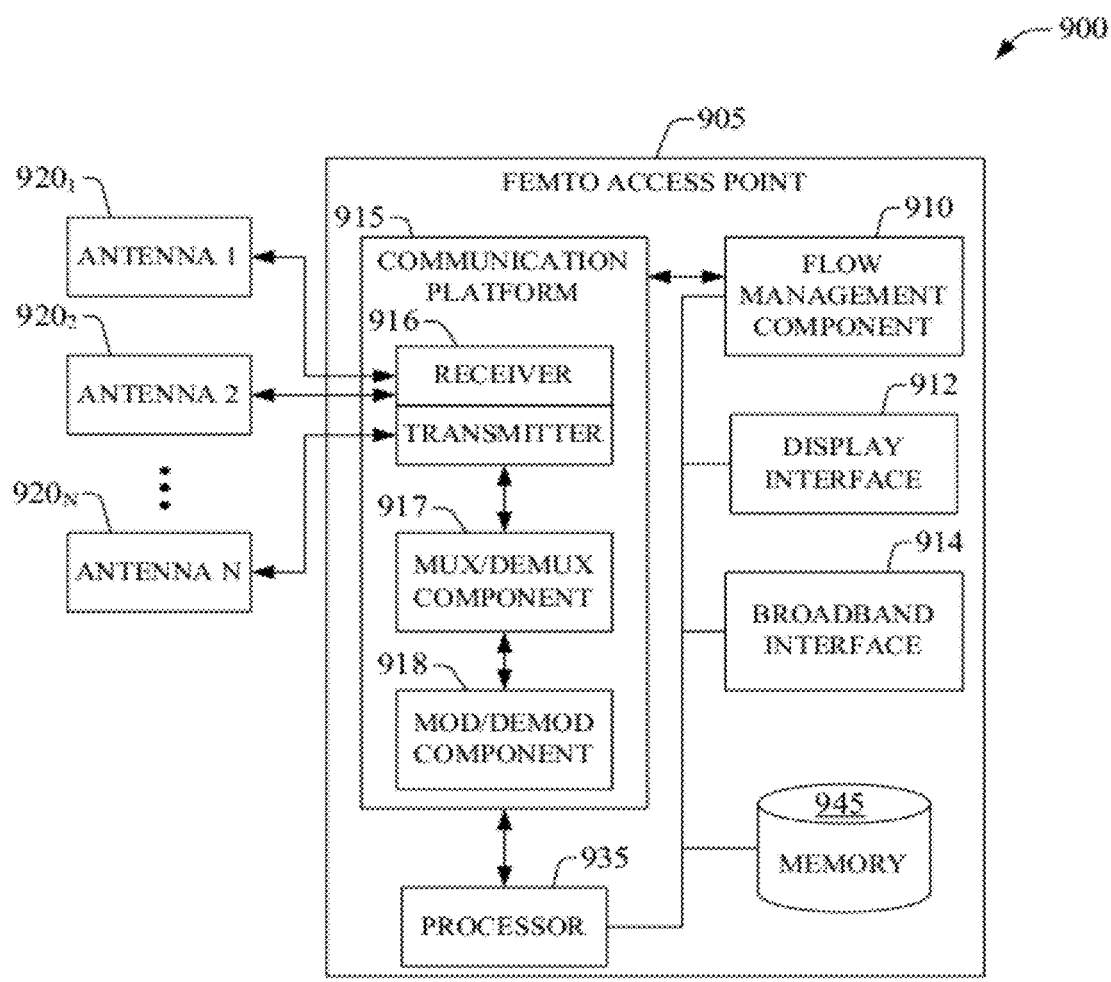
FIG. 9 is a block diagram of an example femto access point that enables and exploits various aspects disclosed in the subject specification.
Figure 10:
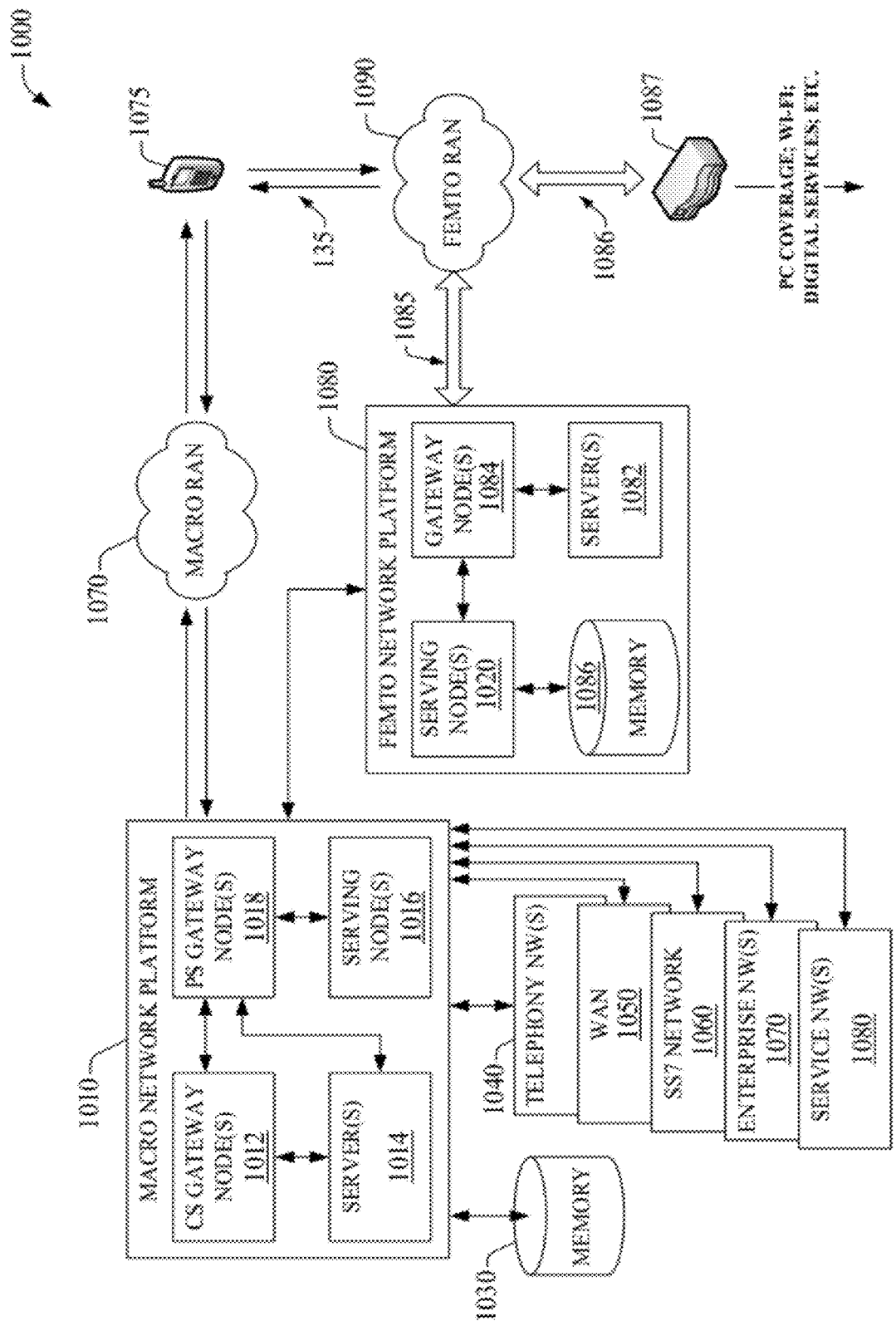
FIG. 10 illustrates example macro and femto wireless network environments that can exploit femto APs that utilize aspects of the subject innovation.

To provide further context for various aspects of the subject specification, FIG. 9 and FIG. 10 illustrate, respectively, a block diagram of an example embodiment of a femto cell access point that can enable and exploit features or aspects of the subject innovation and example macro and femto wireless network environments that can exploit femto APs that utilize aspects of the subject innovation in accordance with various aspects of the subject specification. In embodiment 900, femto AP 905 can receive and transmit signal(s) (e.g., attachment signaling) from and to wireless devices like femto access points, access terminals, wireless ports and routers, or the like, through a set of antennas $920_1$-$920_N$ (N is a positive integer). It should be appreciated that antennas $920_1$-$920_N$ embody at least in part wireless component(s) 452, and are a part of communication platform 915, which comprises electronic components and associated circuitry that provides for processing and manipulation of received signal(s) and signal(s) to be transmitted. Such electronic components and circuitry embody at least in part wireless component(s) 452; communication platform 915 operates in substantially the same manner as communication platform 235 described hereinbefore. In an aspect, communication platform 915 includes a receiver/transmitter 916 that can convert signal from analog to digital upon reception, and from digital to analog upon transmission. In addition, receiver/transmitter 916 can divide a single data stream into multiple, parallel data streams, or perform the reciprocal operation. Coupled to receiver/transmitter 916 is a multiplexer/demultiplexer 917 that facilitates manipulation of signal in time and frequency space. Electronic component 917 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 917 can scramble and spread information (e.g., codes) according to substantially any code known in the art; e.g., Hadamard-Walsh codes, Baker codes, Kasami codes, polyphase codes, and so on. A modulator/demodulator 918 is also a part of communication platform 915, and can modulate information according to multiple modulation techniques, such as frequency modulation, amplitude modulation (e.g., M-ary quadrature amplitude modulation (QAM), with M a positive integer), phase-shift keying (PSK), and the like. Communication platform 915 also includes a coder/decoder (codec) component 919 that facilitates decoding received signal(s), and coding signal(s) to convey.

Femto access point 905 also includes a processor 935 configured to confer functionality, at least in part, to substantially any electronic component in femto AP 905. In particular, processor 935 can facilitate packetized flow management (e.g., identification and provision of fixed QoS) associated with flow management component 910, which operates in the same manner as flow management component 910 in accordance to various aspects and embodiments disclosed herein.

Additionally, femto AP 905 includes display interface 912, which can display functions that control functionality of femto AP 905, or reveal operation conditions thereof. In addition, display interface 912 can include a screen to convey information to an end user; for instance, display interface 912 can display a message to restart femto AP 905, or enter a QoS directive. In an aspect, display interface 912 can be a liquid crystal display (LCD), a plasma panel, a monolithic thin-film based electrochromic display, and so on. Moreover, display interface can also include a component (e.g., speaker(s)) that facilitates communication of aural indicia, which can also be employed in connection with messages that convey operational instructions to an end user. Display interface 912 also facilitates data entry (e.g., through a linked keypad or via touch gestures), which can facilitated femto AP 905 to receive external commands (e.g., restart operation).

Broadband interface facilitates connection of femto AP 905 to a broadband network link such as backhaul links 205 and 282 (not shown), which enable incoming and outgoing data flow, respectively. Broadband network interface 914 can be internal or external to femto AP 905, and it can utilize display interface 912 for end-user interaction and status information delivery.

Processor 935 also is functionally connected to communication platform 915 and can facilitate operations on data (e.g., symbols, bits, or chips) for multiplexing/demultiplexing, such as effecting direct and inverse fast Fourier transforms, selection of modulation rates, selection of data packet formats, inter-packet times, etc. Moreover, processor 935 is functionally connected to display interface 912 and broadband interface 914 to confer, at least in part functionality to each of such components.

In femto AP 905, memory 945 can store data structures, code instructions and program modules, system or device information, code sequences for scrambling, spreading and pilot transmission, femto AP floor plan configuration, and so on. Processor 935 is coupled to the memory 945 in order to store and retrieve information necessary to operate and/or confer functionality to communication platform 915, flow management component 910, and other components of femto access point 905.

With respect to FIG. 10, wireless communication environment 1000 includes two wireless network platforms: (i) A macro network platform 1010 which serves, or facilitates communication with user equipment 1075 (e.g., mobile 120$_A$) via a macro radio access network (RAN) 1070. It should be appreciated that in cellular wireless technologies (e.g., 3GPP UMTS, HSPA, 3GPP LTE, 3GPP2 UMB), macro network platform 1010 is embodied in a Core Network. (ii) A femto network platform 1080, which can provide communication with UE 1075 through a femto RAN 1090, which is linked to the femto network platform 1080 via backhaul pipe(s) 1085 (e.g., backhaul link(s) 153). It should be appreciated that macro network platform 1010 typically hands off UE 1075 to femto network platform 1080 once UE 1075 attaches (e.g., through macro-to-femto handover) to femto RAN 1090, which includes a set of deployed femto APs (e.g., femto AP 130) that can operate in accordance with aspects described herein.

It is noted that RAN includes base station(s), or access point(s), and its associated electronic circuitry and deployment site(s), in addition to a wireless radio link operated in accordance with the base station(s). Accordingly, macro RAN 1070 can comprise various coverage cells like cell 105, while femto RAN 1090 can comprise multiple femto cell access points such as femto AP 130. Deployment density in femto RAN 1090 is substantially higher than in macro RAN 1070.

Generally, both macro and femto network platforms 1010 and 1080 include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect of the subject innovation, macro network platform 1010 includes CS gateway node(s) 1012 which can interface CS traffic received from legacy networks like telephony network(s) 1040 (e.g., public switched telephone network (PSTN), or public land mobile network (PLMN)) or a SS7 network 1060. Circuit switched gateway 1012 can authorize and authenticate traffic (e.g., voice) arising from such networks. Additionally, CS gateway 1012 can access mobility, or roaming, data generated through SS7 network 1060; for instance, mobility data stored in a VLR, which can reside in memory 1030. Moreover, CS gateway node(s) 1012 interfaces CS-based traffic and signaling and gateway node(s) 1018. As an example, in a 3GPP UMTS network, PS gateway node(s) 1018 can be embodied in gateway GPRS support node(s) (GGSN).

In addition to receiving and processing CS-switched traffic and signaling, PS gateway node(s) 1018 can authorize and authenticate PS-based data sessions with served (e.g., through macro RAN) wireless devices. Data sessions can include traffic exchange with networks external to the macro network platform 1010, like wide area network(s) (WANs) 1050, enterprise networks (NW(s)) 1070 (e.g., enhanced 911), or service NW(s) 1080 like IP multimedia subsystem (IMS); it should be appreciated that local area network(s) (LANs), which may be a part of enterprise NW(s), can also be interfaced with macro network platform 1010 through PS gateway node(s) 1018. Packet-switched gateway node(s) 1018 generates packet data contexts when a data session is established. To that end, in an aspect, PS gateway node(s) 1018 can include a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can include multiple flows that can be generated through server(s) 1014. It is to be noted that in 3GPP UMTS network(s), gateway node(s) 1018 (e.g., GGSN) and tunnel interface (e.g., TTG) comprise a packet data gateway (PDG).

Macro network platform 1010 also includes serving node(s) 1016 that convey the various packetized flows of information, or data streams, received through PS gateway node(s) 1018. As an example, in a 3GPP UMTS network, serving node(s) can be embodied in serving GPRS support node(s) (SGSN).

As indicated above, server(s) 1014 in macro network platform 1010 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can include add-on features to standard services provided by macro network platform 1010. Data streams can be conveyed to PS gateway node(s) 1018 for authorization/authentication and initiation of a data session, and to serving node(s) 1016 for communication thereafter. Server(s) 1014 can also effect security (e.g., implement one or more firewalls) of macro network platform 1010 to ensure network's operation and data integrity in addition to authorization and authentication procedures that CS gateway node(s) 1012 and PS gateway node(s) 1018 can enact. Moreover, server(s) 1014 can effect time protocols (e.g., Network Time Protocol) and embody one or more portions of clock strata. Furthermore, server(s) 1014 can provision services from external network(s), e.g., WAN 1050, or Global Positioning System (GPS) network(s), which can be a part of enterprise NW(s) 1080. It is to be noted that server(s) 1014 can include one or more processor configured to confer at least in part the functionality of macro network platform 1010. To that end, the one or more processor can execute code instructions stored in memory 1030, for example.

In example wireless environment 1000, memory 1030 stores information related to operation of macro network platform 1010. Information can include business data associated with subscribers; market plans and strategies, e.g., promotional campaigns, business partnerships; operational data for mobile devices served through macro network platform; service and privacy policies; end-user service logs for law enforcement; and so forth. Memory 1030 can also store information from at least one of telephony network(s) 1040, WAN 1050, SS7 network 1060, enterprise NW(s) 1070, or service NW(s) 1080.

Regarding femto network platform 1080, it includes a femto gateway node(s) 1084, which have substantially the same functionality as PS gateway node(s) 1018. Additionally, femto network platform 1080 include femto serving node(s) 1020 which have substantially the same functionality as serving node(s) 1016. Disparate gateway node(s) 1084 can control or operate disparate sets of deployed femto APs, which can be a part of femto RAN 1090. In an aspect, as described herein, one or more of the femto APs in the set of deployed femto APs can be configured in a passthrough configuration, conveying data streams via respective wired broadband link 1086 to respective hubs or routers 1087 that supplies the data streams to one or more devices; the one or more femto APs that supply data streams also receive data streams from respective hubs or routers 1087. In an aspect of the subject innovation, femto gateway node(s) 1084 can aggregate operational data received from deployed femto APs. Moreover, femto gateway node(s) 1084, can convey received attachment signaling to attachment component 1020. It should be appreciated that while attachment component is illustrated as external to gateway node(s) 1084, attachment component 1020 can be an integral part of gateway node(s) 1084.

Memory 1086 can retain additional information relevant to operation of the various components of femto network platform 1080. For example operational information that can be stored in memory 1086 can comprise, but is not limited to, subscriber intelligence; contracted services; maintenance and service records; femto cell configuration (e.g., devices served through femto RAN 1090; authorized subscribers associated with one or more deployed femto APs); service policies and specifications; privacy policies; add-on features; so forth.

Server(s) 1082 have substantially the same functionality as described in connection with server(s) 1014. In an aspect, server(s) 1082 can execute multiple application(s) that provide service (e.g., voice and data) to wireless devices served through femto RAN 1090. Server(s) 1082 can also provide security features to femto network platform. In addition, server(s) 1082 can manage (e.g., schedule, queue, format . . . ) substantially all packetized flows (e.g., IP-based, frame relay-based, ATM-based, X.25-based . . . ) it generates in addition to data received from macro network platform 1010. Furthermore, server(s) 1082 can effect provisioning of femto cell service, and effect operations and maintenance. It is to be noted that server(s) 1082 can include one or more processors configured to provide at least in part the functionality of femto network platform 1080. To that end, the one or more processors can execute code instructions stored in memory 1086, for example.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, the term "memory" refers to data stores, algorithm stores, and substantially any other information store relevant to operation and functionality of a component comprising the memory; for instance, such information can comprise, but is not limited to comprising, subscriber information, femto cell configuration (e.g., devices served by a femto AP) and service policies and specifications, location identifiers, and so forth. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method; apparatus, either as hardware or hardware and software or firmware; or article of manufacture using standard programming and/or engineering techniques. Implementation(s) that include software or firmware can be implemented at least in part through program modules stored in a memory and executed by a processor. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical discs [e.g., compact disk (CD), digital versatile disc (DVD), Blu-ray disc (BD) . . . ], smart cards, and flash memory devices (e.g., card, stick, key drive . . . ).

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the terms "includes," "has," "possesses," and the like are used in either the detailed description or the claims, such term is intended to be inclusive in a manner similar to the term "comprising" as "comprising" is interpreted when employed as a transitional word in a claim.

What is claimed is:

1. A system, comprising:
   a memory to store instructions; and
   a processor, coupled to the memory, that facilitates execution of the instructions to perform operations, comprising:
      separating a packetized stream into a first packet flow for a first device serviced with femto cell coverage and a second packet flow for a second device serviced with non-femto cell coverage; and
      providing a first quality of service for the first packet flow defined in accordance with a first quality of service policy for wireless transmission via a femto access point device of a femto cell network facilitating the femto cell coverage and a second fixed quality of service for the second packet flow defined in accordance with a second quality of service policy for transmission via a wide area network device of a wide area network facilitating the non-femto cell coverage,
      wherein the first quality of service is fixed for wireless transmissions via the femto access point device of the femto cell network facilitating the femto cell coverage, and
      wherein the second quality of service is fixed for transmissions via the wide area network device facilitating the non-femto cell coverage.

2. The system of claim 1, wherein the operations further comprise receiving the packetized stream via a wired wide area network connection and analyzing the packetized stream to facilitate the separating of the packetized stream.

3. The system of claim 1, wherein the operations further comprise processing the first packet flow according to the first quality of service policy and the second packet flow according to the second quality of service policy.

4. The system of claim 1, wherein the first quality of service is different from the second quality of service.

5. The system of claim 1, wherein the operations further comprise facilitating routing of the first packet flow to a transmitter operable to transmit the first packet flow wirelessly according to the first quality of service.

6. The system of claim 1, wherein the operations further comprise facilitating routing of the second packet flow to an interface operable to transmit the second packet flow via a wired wide area network connection to the wide area network according to the second quality of service.

7. The system of claim 1, wherein the operations further comprise directing the second packet flow to the second device via a wired connection to the wide area network.

8. A method, comprising:
   receiving, by a femto cell device comprising a processor via a passthrough traffic configuration that facilitates supplying a quality of service to data flows, a packet stream comprising a first data flow and a second data flow;
   separating, by the femto cell device, the first data flow and the second data flow from the packet stream;
   identifying, by the femto cell device, the first data flow as directed to a first device served by femto cell coverage;
   assigning, by the femto cell device, a first quality of service requirement for the femto cell coverage to the first data flow according to a first quality of service policy;
   identifying, by the femto cell device, the second data flow as directed to a second device served by non-femto cell coverage; and
   assigning, by the femto cell device, a second quality of service requirement for non-femto cell coverage different than the first quality of service requirement to the second data flow according to a second quality of service policy different from the first quality of service policy
   wherein the first quality of service requirement is statically defined for wireless transmissions via the femto access point device of the femto cell network facilitating the femto cell coverage, and
   wherein the second quality of service requirement is statically defined for transmissions via the wide area network device facilitating the non-femto cell coverage.

9. The method of claim 8, wherein the non-femto cell coverage is a wired wide area network coverage.

10. The method of claim 8, further comprising facilitating, by the femto cell device, routing of the first data flow to a communication platform device for wireless delivery according to the first quality of service requirement.

11. The method of claim 8, further comprising facilitating, by the femto cell device, routing of the second data flow to a wide area network interface for delivery, via an auxiliary wide area network connection to the non-femto cell coverage, according to the second quality of service requirement.

12. The method of claim 8, further comprising defining, by the femto cell device, the first quality of service requirement based on a parameter associated with the femto cell coverage.

13. The method of claim 12, wherein the defining further comprises configuring the first quality of service requirement based on an input to the first device.

14. The method of claim 12, wherein the defining further comprises configuring the first quality of service requirement based on a quality of service policy received from a another femto cell device facilitating provision of the femto cell coverage.

15. The method of claim 12, wherein the defining further comprises configuring the first quality of service requirement based on a requirement received from the first device.

16. The method of claim 8, further comprising validating, by the femto cell device, that the first quality of service requirement satisfies a system quality of service requirement of a provider of the femto cell coverage.

17. A femto cell device, comprising:
a memory to store instructions; and
a processor, coupled to the memory, that facilitates execution of the instructions to perform operations, comprising:
separating a first packet flow and a second packet flow from a received packetized data stream;
identifying the first packet flow as directed to a first device served by femto cell coverage;
identifying the second packet flow as directed to a second device served by wide area network coverage external to the femto cell coverage; and
providing a first quality of service, defined for the femto cell coverage according to a first quality of service policy, to the first packet flow and a second quality of service, defined for the wide area network coverage according to a second quality of service policy, to the second packet flow,
wherein the first quality of service is fixed for wireless transmissions served by the femto cell coverage, and
wherein the second quality of service is fixed for transmissions serviced by non-femto cell coverage.

18. The femto cell device of claim 17, wherein the femto cell device is configured according to a passthrough traffic configuration that facilitates supplying a hard quality of service to data flows.

19. The femto cell device of claim 17, wherein the first quality of service is different from the second quality of service.

20. The femto cell device of claim 17, wherein the wide area network coverage is provided by a wired broadband device associated with a wired broadband link external to the femto cell coverage.

\* \* \* \* \*